United States Patent

Nelson

[15] 3,654,948
[45] Apr. 11, 1972

[54] BALANCED PRESSURE REGULATOR

[72] Inventor: Richard E. Nelson, Palos Verdes Peninsula, Calif.

[73] Assignee: Honeywell Inc., Minneapolis, Minn.

[22] Filed: Nov. 2, 1970

[21] Appl. No.: 86,239

[52] U.S. Cl. .................. 137/118, 137/489.5, 137/505.18
[51] Int. Cl. ........................................................ F16k 31/365
[58] Field of Search ............ 137/118, 489.5, 505.13, 505.15, 137/505.18; 251/282

[56] References Cited

UNITED STATES PATENTS 2,487,089  11/1949  Anthes ............................ 137/489.5
2,841,173  7/1958   Masom et al. .................... 137/505.18
3,456,681  7/1969   Faisandier ..................... 137/505.18 X Primary Examiner—Robert G. Nilson
Attorney—Lamont B. Koontz and Alan M. Staubly

[57] ABSTRACT

A balanced pressure regulator valve having a pressure chamber between a diaphragm actuator for the valve and a portion of the valve stem to provide an inlet pressure in the pressure chamber which is substantially equal to the inlet pressure on the inlet side of the valve. The portion of the diaphragm forming the balancing pressure chamber has a fixed portion for the adjoining portion of the diaphragm to react against while permitting the remaining portion of the diaphragm to respond to outlet pressure to variably position the valve.

10 Claims, 2 Drawing Figures

INVENTOR.
RICHARD E. NELSON
BY
Alan M. Staubly
ATTORNEY.

BALANCED PRESSURE REGULATOR

This invention relates to pressure regulators and, more specifically, to a gas pressure regulator having means to compensate for changes in inlet pressure so as to maintain a uniform outlet pressure regardless of wide variations in inlet pressure and flow rates.

The invention is an improvement over the valve disclosed in a co-pending application of Nickolas J. Sidaris, Ser. N. 64,430, filed Aug. 17, 1970. The valve also is an improvement over conventional pressure regulators that are subjected to atmospheric pressure and a spring biasing force in the side of its diaphragm opposite the regulator valve.

Figure 1:
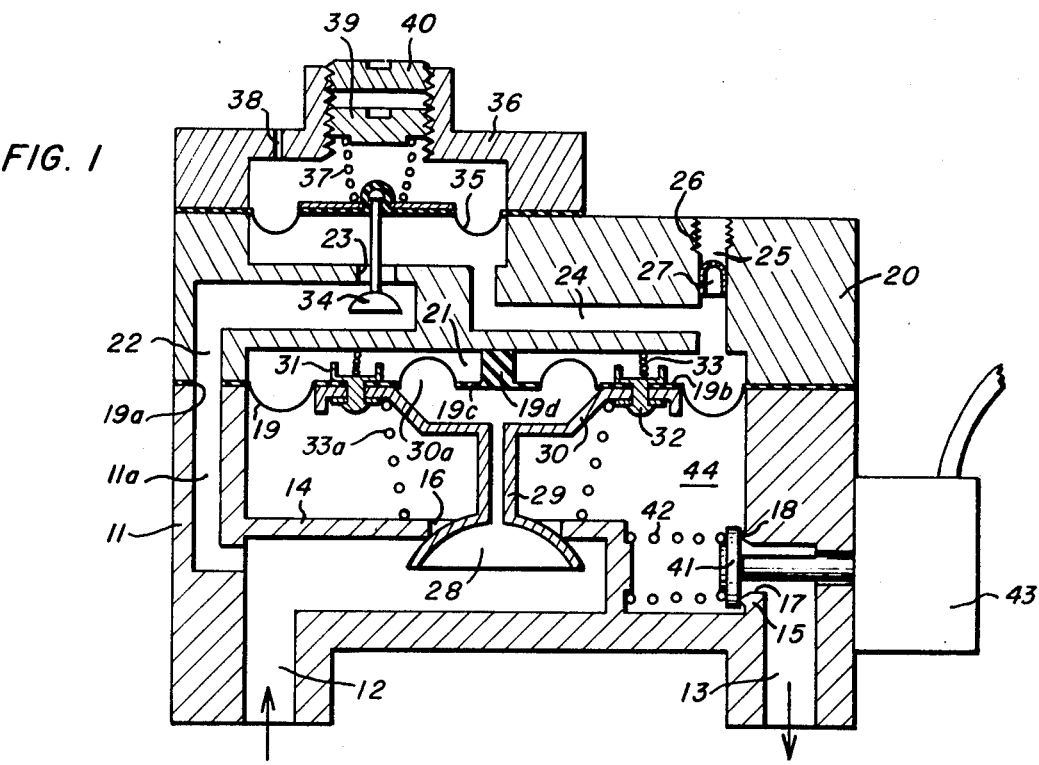
Figure 2:
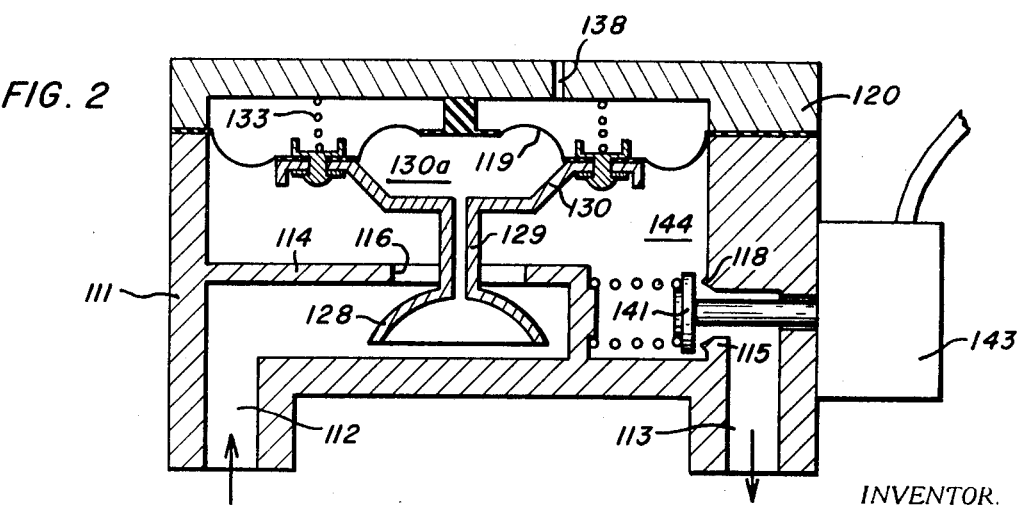

FIG. 1 of the drawing illustrates the invention more or less diagrammatically in one form thereof, and FIG. 2 illustrates diagrammatically a modification of the invention, showing the valve in its open position.

Referring to FIG. 1 of the drawing, the valve body is generally designated by the reference numeral 11 and has an inlet 12 and an outlet 13, with partition walls 14 and 15 therebetween. Wall 14 has an aperture 16 therethrough which forms at the lower periphery thereof a valve seat. The wall 15 has an aperture 17 therethrough with a valve seat 18 extending around the aperture. A one-piece flexible diaphragm 19 is clamped between the body 11 and a cover 20 by any suitable means (not shown). The cover has a recess 21 therein that provides a pressure chamber above the diaphragm 19 and has a passageway 22 that extends from a hole 19a in the diaphragm to a valve seat 23 and registers through the hole 19a with a passageway 11a, in the body 11, extending to the inlet 12. The other end of the valve seat opening 23 communicates with the pressure chamber above the diaphragm through a passageway 24. The passageway 25 extends from the passageway 24 to an outlet 26 which is adapted to be connected to a pilot burner (not shown). The passageway 25 has an orifice restricter 27 therein for limiting gas flow, in the event the pilot burner is of the atmospheric type, but may be eliminated if the pilot burner has an orifice member therein to restrict gas flow.

A pressure regulator valve 28 is adapted to cooperate with the valve seat at the lower end of the aperture 16 and has a hollow valve stem 29 which terminates at its upper end in a flange portion 30. The periphery of the flange is secured to a channel-shaped ring 31 on the opposite side of the diaphragm 19, with the thickened portion 19b of the diaphragm clamped therebetween, by means of a plurality of rivets 32 (or other suitable means). A thickened central portion 19c of the diaphragm has a boss 19d thereon which abuts against the upper wall of the recess 21.

A conventional pressure regulator valve 34 is positioned to co-act with the valve seat 23 to regulate gas flow from the inlet 12 to the passageway 25 leading to the pilot burner outlet. The valve 34 is connected to a diaphragm 35 which is clamped between the cover 20 and the secondary cover 36 for the valve diaphragm 35. A compression spring 37 normally biases the valve 34 toward its open position. The space above the diaphragm 35 communicates with the atmosphere through an opening 38. An adjustment screw 39 enables the loading of the spring 37 to be varied while a closure cap 40 seals the opening above the adjustment screw.

A conventional control valve 41 is biased to its closed position by means of a coil spring 42 and is adapted to be opened by means of any suitable valve actuator means, designated by the reference numeral 43.

The invention form disclosed in FIG. 1 is illustrated as being in its closed position, due to the fact that the valve 41 is closed, and assuming that the valve is installed in a gas heating system, gas at inlet pressure would be present in the space below the diaphragm 19 and flange 30, as well as in the chamber between diaphragm 19 and flange 30. Inlet pressure is also present in passages 11a and 22. Under these conditions, the pressure above the diaphragm 19 would be outlet pressure in passageway 24 so that the total pressure acting in the direction to close valve 28 exceeds the pressures tending to open the valve. Upon a call for heat by suitable thermostatic means (not shown) controlling the valve actuator 43, valve 41 is opened to relieve the pressure under diaphragm 19 and thus permit the valve opening forces to open the valve 28 and permit gas flow to main burner through outlet 13. Should there be too large an increase in outlet pressure, the pressure forces below the diaphragm 19 will exceed the pressure forces acting to open the valve 28, and the valve 28 will move toward its seat to maintain a substantially constant outlet pressure equal to or proportional to the pressure in passageway 24. During this functional sequence, the pressure in passageway 12 and in the space 30a between diaphragm 19 and flange 30 remains substantially at inlet pressure. The effective area of the center section of diaphragm 19 above flange 30, which cooperates to form chamber 30a, is substantially the same as the effective area of the valve 28 against seat 16, thus creating an equal and opposite force acting to counterbalance the force created on valve 28 by the pressure drop through valve 28 and seat 16. Should inlet pressure change, both valve 28 and chamber 30a will experience the change, and since the effective areas remain substantially the same as valve 28 moves in relation to seat 16, the forces acting on the system caused by a change in inlet pressure remain balanced.

It will also be noted that the pressure above the diaphragm 19 will be the same as the outlet pressure from the pressure regulator 34 so that the outlet pressure in chamber 44 will be substantially the same as the outlet pressure at 24. However, a difference in outlet pressures at 13 and 24 may be accomplished by changing the loading on the diaphragm 19 by means of different strength springs 33 or 33a, depending on which pressure, 13 or 24, is intended to be the higher. Spring 33 will make pressure 13 higher than 24.

The modification of the invention disclosed in FIG. 2 of the drawing has a valve body 111, an inlet 112, an outlet 113, a partition wall 114 and a partition wall 115. It also has an opening 116 terminating in a valve seat for a pressure regulated valve 128 and a valve seat 118 for a control valve 141. The valve stem 129 and the diaphragm 119 have an arrangement similar to that shown in FIG. 1, with the only difference being in the use of a heavier coil spring 133 acting on the upper side thereof and reacting against a different shaped cover 120 from that of FIG. 1. This cover communicates with the atmosphere through an opening 138 so as to cause the entire pressure regulator of this modification to generally act in the manner of a conventional pressure regulator. However, it differs from a conventional regulator in that it provides for the balancing or compensating for variations in inlet pressure by providing the pressure chamber between the center portion of the diaphragm 119 and the upper surface of flange 130.

The operation of the modification of FIG. 2 is generally similar to that of the one in FIG. 1 except that the loading of the regulator is dependent upon the spring 133 rather than on the outlet pressure from the servo regulator 34 of FIG. 1. This modification, like the regulator of FIG. 1, provides compensation for variations in the inlet pressure so as to maintain a more constant outlet pressure at 113 with wide fluctuations in inlet pressure and/or variations in the rate of gas flow through the valve body.

The embodiments of the invention in which an exclusive property or right is claimed are defined as follows:

1. A pressure regulator valve comprising a body having an inlet and an outlet and a partition wall therebetween, said partition wall having an opening therethrough providing a valve seat, a valve positioned to cooperate with said seat to control fluid flow through the valve body, a movable wall in said body exposed to fluid between said partition wall and said outlet, valve stem means extending from said valve to said movable wall and forming an expandable chamber with a first portion of said movable wall, a second portion of said movable wall being movable with said valve stem means and relative to a part of said first portion, a passageway extending from said inlet to said expandable chamber, and means resiliently biasing said second portion and valve stem means and valve in a valve opening direction.

2. A pressure regulator valve as defined in claim 1 wherein said movable wall includes flexible diaphragm means.

3. A pressure regulator valve as defined in claim 1 wherein said movable wall is a one-piece diaphragm.

4. A pressure regulator valve as defined in claim 1 wherein said valve stem means has an annular portion connected to said second portion of said movable wall.

5. A pressure regulator valve as defined in claim 1 wherein said passageway extends through said valve and said stem means.

6. A pressure regulator valve as defined in claim 1 wherein said body has a pressure chamber on the other side of said movable wall from said valve and has a passageway extending from a low pressure area in said body to said pressure chamber.

7. A pressure regulator as defined in claim 6 wherein said body has an outlet passageway for connection to a pilot burner, and said low pressure area is connected to said outlet passageway.

8. A pressure regulator as defined in claim 1 wherein said body has a space above said movable wall and communicating with the atmosphere.

9. A pressure regulator as defined in claim 4 wherein said passageway extends through said stem means.

10. A pressure regulator as defined in claim 9 wherein said movable wall includes a flexible diaphragm.

* * * * *